(12) United States Patent
Isshiki et al.

(10) Patent No.: US 10,386,222 B2
(45) Date of Patent: Aug. 20, 2019

(54) LIQUID DETECTING APPARATUS AND LIQUID CONTAINER

(71) Applicant: Seiko Epson Corporation, Tokyo (JP)

(72) Inventors: Tetsuya Isshiki, Shiojiri (JP); Takayuki Yonemura, Suwa (JP)

(73) Assignee: Seiko Epson Corporation (JP)

( * ) Notice: Subject to any disclaimer, the term of this patent is extended or adjusted under 35 U.S.C. 154(b) by 96 days.

(21) Appl. No.: 15/801,662

(22) Filed: Nov. 2, 2017

(65) Prior Publication Data

US 2018/0143063 A1   May 24, 2018

(30) Foreign Application Priority Data

Nov. 14, 2016   (JP) .................................. 2016-221911

(51) Int. Cl.
*G01F 23/296*   (2006.01)
*B41J 2/175*   (2006.01)

(52) U.S. Cl.
CPC ...... *G01F 23/2968* (2013.01); *B41J 2/17513* (2013.01); *B41J 2/17523* (2013.01); *B41J 2/17553* (2013.01); *B41J 2/17566* (2013.01); *G01F 23/2966* (2013.01); *B41J 2002/17583* (2013.01)

(58) Field of Classification Search
None
See application file for complete search history.

(56) References Cited

U.S. PATENT DOCUMENTS

| 6,196,664 B1* | 3/2001 | Kanda ................. B41J 2/04581 347/46 |
| 7,156,495 B2* | 1/2007 | Silverbrook ........... B41J 2/1433 347/54 |
| 7,192,119 B2* | 3/2007 | Silverbrook ............... B41J 2/16 347/54 |
| 7,287,836 B2* | 10/2007 | Silverbrook ........... B41J 2/1412 347/56 |
| 7,328,490 B2* | 2/2008 | Murai ................. B41J 2/14233 29/25.35 |

(Continued)

FOREIGN PATENT DOCUMENTS

| JP | 2001-146030 A | 5/2001 |
| JP | 2006-281550 A | 10/2006 |

(Continued)

*Primary Examiner* — Peter J Macchiarolo
*Assistant Examiner* — Jermaine L Jenkins
(74) *Attorney, Agent, or Firm* — Harness, Dickey & Pierce, P.L.C.

(57) ABSTRACT

A liquid detecting apparatus includes an ultrasonic sensor that transmits and receives an ultrasonic wave, and includes a piezoelectric layer which is formed of a thin film and an ultrasonic element which is provided with a first electrode and a second electrode to interpose the piezoelectric layer between the first electrode and the second electrode, on a diaphragm which is disposed on a substrate having a cavity, and a flow path that forms the same liquid level as a liquid level of a liquid which is stored in a container, in which an acoustic matching layer and a detection surface of a surface of a lens, which are disposed on a side of the ultrasonic sensor that transmits and receives the ultrasonic wave, are disposed to be in contact with the liquid within the flow path.

12 Claims, 7 Drawing Sheets

(56) References Cited

U.S. PATENT DOCUMENTS

| | | | | |
|---|---|---|---|---|
| 7,360,865 | B2* | 4/2008 | Silverbrook | B41J 2/14314 |
| | | | | 347/40 |
| 7,527,357 | B2* | 5/2009 | Silverbrook | B41J 2/14314 |
| | | | | 347/54 |
| 10,074,796 | B2* | 9/2018 | Ueda | B41J 2/14274 |
| 10,103,314 | B2* | 10/2018 | Miura | B32B 18/00 |
| 2006/0219726 | A1 | 10/2006 | Yajima et al. | |
| 2017/0155035 | A1* | 6/2017 | Matsuda | H04R 17/005 |

FOREIGN PATENT DOCUMENTS

| | | |
|---|---|---|
| JP | 2010-167650 A | 8/2010 |
| JP | 2015-205806 A | 11/2015 |

* cited by examiner

FIG. 11

LIQUID DETECTING APPARATUS AND LIQUID CONTAINER

This application claims priority under 35 U.S.C. § 119 to Japanese Patent Application No. 2016-221911 filed on Nov. 14, 2016, the entire disclosure of which is expressly incorporated by reference herein.

BACKGROUND

1. Technical Field

The present invention relates to a liquid detecting apparatus that detects information on a liquid such as a liquid residual amount, and a liquid container including the same.

2. Related Art

In order to supply a liquid to be ejected to a liquid ejecting apparatus such as an ink jet printer, a liquid container that accommodates the liquid is used.

In the related art, as a method for managing a liquid residual amount inside the liquid container, known is a method in which the liquid is managed by adding the amount of the liquid ejected by the liquid ejecting apparatus with software, or a method in which a liquid residual amount sensor is disposed in the liquid container. As an example of the latter, the liquid residual amount sensor including a piezoelectric element is known (see JP-A-2001-146030 and JP-A-2006-281550). The sensor detects the liquid residual amount within the liquid container by using a change of a resonance frequency in a residual vibration signal that is caused by a residual vibration (free vibration) of a diaphragm after a forced vibration, in a case where the liquid is present and a case where the liquid is not present, inside a cavity facing the diaphragm on which the piezoelectric elements are stacked.

In the sensor, in order to solve problems that vibration absorption of the diaphragm (piezoelectric element) is not sufficiently prevented, and degradation in detection performance of the sensor is caused, a sensor that prevents the degradation in detection performance of the sensor due to the vibration absorption of the piezoelectric element has been proposed (see JP-A-2010-167650).

Since a piezoelectric layer of a bulk is used in a configuration of the related art described above, there are problems that the resonance frequency becomes an order of several tens kHz, and sharpness of separation of a resonance peak is poor depending on presence or absence of an ink. There is a need for multiple leakage designs so that an ink leakage is not caused even in a case of being incorporated into the liquid container, since shrinkage scattering caused by baking is made due to a ceramic component, and there is also a problem that the need leads to a cost increase.

SUMMARY

An advantage of some aspects of the invention is to provide a liquid detecting apparatus which improves detection performance of a liquid, and is likely to be incorporated, and a liquid container including the same.

According to an aspect of the invention, there is provided a liquid detecting apparatus including an ultrasonic sensor that transmits and receives an ultrasonic wave, and includes a piezoelectric layer which is formed of a thin film and an ultrasonic element which is provided with a first electrode and a second electrode to interpose the piezoelectric layer between the first electrode and the second electrode, on a diaphragm which is disposed on a substrate having a cavity, and a flow path that forms the same liquid level as a liquid level of a liquid which is stored in a container, in which an acoustic matching layer and a detection surface of a surface of a lens, which are disposed on a side of the ultrasonic sensor that transmits and receives the ultrasonic wave, are disposed to be in contact with the liquid within the flow path.

In the aspect, since the piezoelectric layer of the thin film is used, it is possible to achieve improvement in detection performance, and it is possible to relatively easily perform a disposition in a state of being in contact with the liquid.

Here, for example, a liquid amount may be detected depending on a change of a voltage when the ultrasonic wave transmitted from the ultrasonic element is received. Thereby, it is possible to relatively easily detect the liquid, by detecting the voltage.

For example, a liquid amount may be detected from frequency dependence when a voltage of which a frequency is changed is applied to the ultrasonic element. Thereby, it is possible to detect the amount of the liquid by grasping a resonance frequency of the liquid detecting apparatus with the liquid. The detection performance is improved in comparison with a bulk, due to the piezoelectric layer of the thin film.

For example, the detection surface of the ultrasonic sensor may be on a side that is opposite to the diaphragm of the ultrasonic element, and may be the surface of the lens that is disposed on the acoustic matching layer covering the ultrasonic element. Thereby, the ultrasonic wave is emitted from the ultrasonic element side, and the detection performance is further improved.

The detection surface of the ultrasonic sensor may be on a side of the cavity, and may be the surface of the lens that is disposed on the acoustic matching layer with which the cavity is filled. Accordingly, a liquid-proof structure of the ultrasonic element is relatively easily made.

For example, a solid content may be dispersed into the liquid, and a dispersion state of the solid content may be detected from the frequency dependence when the voltage of which the frequency is changed is applied to the ultrasonic element. Accordingly, it is possible to detect the dispersion state of the solid content in the liquid into which the solid content is dispersed.

According to another aspect of the invention, there is provided a liquid container including the liquid detecting apparatus according to any one of the above aspects.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, embodiments of the invention will be described with reference to the drawings. The following description illustrates an aspect of the invention, and may be arbitrarily modified within the scope of the invention. In each drawing, a member denoted by the same reference numeral or mark indicates the same member, and the description thereof will be appropriately omitted.

First Embodiment

Figure 1:
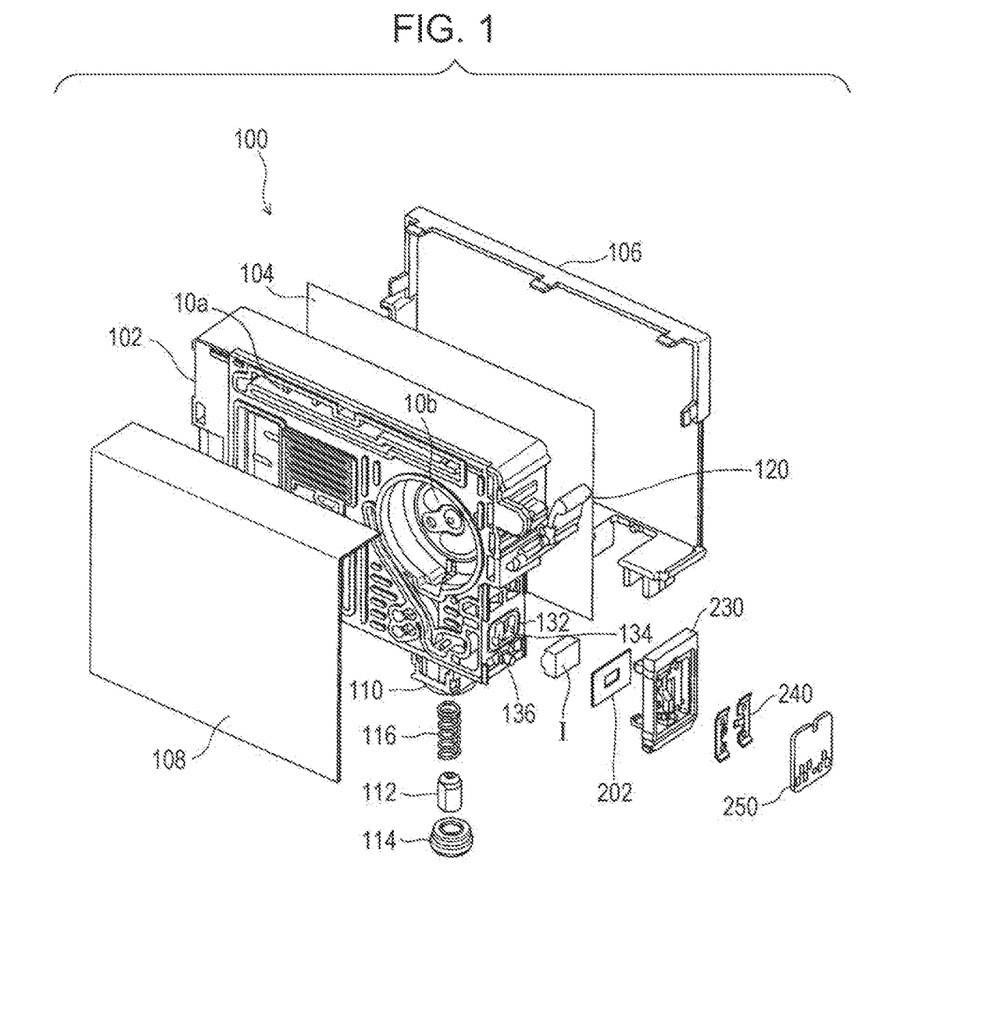
FIG. 1 is an exploded perspective view illustrating a configuration example of a liquid container according to a first embodiment.

FIG. 1 is an exploded perspective view illustrating an outline configuration of an ink cartridge 100 that is a liquid container including a liquid detecting apparatus according to a first embodiment.

The ink cartridge 100 includes a container main portion 102, a first film 104, a second film 108, and a lid portion 106. For example, the members are formed of resins (for example, polypropylene or polyethylene) which may be thermally welded to each other. A liquid supply portion 110 is formed on a lower surface of the container main portion 102. Inside the liquid supply portion 110, a sealing member 114, a spring seat 112, and a closing spring 116 are accommodated in sequence from the lower surface. When an ink supply needle (not illustrated) of a printing head unit is inserted in the liquid supply portion 110, the sealing member 114 seals so that a gap is not generated between an inner wall of the liquid supply portion 110 and an outer wall of the ink supply needle. When the ink cartridge 100 is not mounted in the printing head unit, the spring seat 112 closes the liquid supply portion 110 by abutting against the inner wall of the sealing member 114. The closing spring 116 is biased in a direction in which the spring seat 112 abuts against the inner wall of the sealing member 114. If the ink supply needle is inserted into the liquid supply portion 110, an upper end of the ink supply needle pushes up the spring seat 112, the gap is generated between the spring seat 112 and the sealing member 114, and an ink is supplied to the ink supply needle from the gap.

On a surface and a rear surface of the container main portion 102, and a front surface being a surface of a side to which a liquid detecting apparatus I described later is attached, a flow path forming portion having various shapes such as a rib 10*a* is formed. The first film 104 and the second film 108 are stuck to the container main portion 102 so as to cover the whole of the surface and the rear surface of the container main portion 102. The first film 104 and the second film 108 are minutely stuck to the container main portion 102 so as not to generate the gap between the first film 104, the second film 108, and an end surface of the flow path forming portion formed in the container main portion 102. By the flow path forming portion, the first film 104, and the second film 108, a liquid flow path such as a plurality of small chambers or a minute fluid path is divided and formed, inside the ink cartridge 100. A negative pressure generating valve is disposed between a valve accommodating portion 10*b* formed in the container main portion 102 as a portion of the flow path forming portion, and the second film 108, but the illustration thereof is omitted in order to avoid complication of the drawings. The lid portion 106 is mounted on the rear surface side of the container main portion 102 so as to cover the first film 104.

On the front surface of the container main portion 102, a lever 120 engaging with a holder side which is disposed in the printing head unit is disposed. For example, at a downward position of the lever 120, a base member accommodating portion 134 which is a portion of the flow path forming portion is open. A welding rib is formed in the vicinity of an opening portion 132 of the base member accommodating portion 134. A liquid detection flow path communicating with a lower portion is formed, inside the opening portion 132 of the base member accommodating portion 134 so that a liquid level becomes the same as the ink within the internal flow path forming portion, and the liquid detecting apparatus I is welded onto the welding rib of the opening portion 132.

Figure 2:
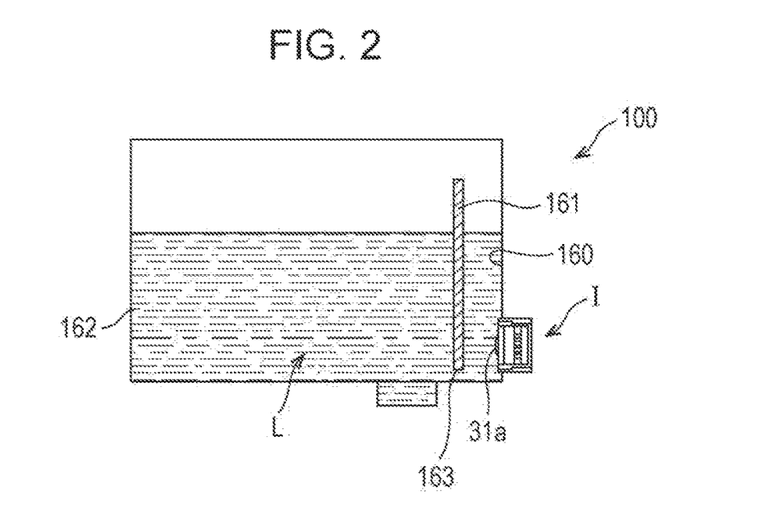
FIG. 2 is a schematic diagram of the liquid container according to the first embodiment.

FIG. 2 schematically illustrates an attachment state of the liquid detecting apparatus I. As illustrated in FIG. 2, a liquid detection flow path 160 is disposed within the ink cartridge 100, separately from the liquid flow path forming portion 162 through a partition wall 161, and inks L of both sides communicate with each other through a communication portion 163 of a lower portion. Therefore, the liquid detecting apparatus I is disposed in a state where a detection surface 31*a* is in contact with the ink L.

A cover 230 is disposed so as to protect the liquid detecting apparatus I. A relay terminal 240 is accommodated in the cover 230. The relay terminal 240 includes a terminal that is in contact electrically with an electrode terminal not illustrated in the liquid detecting apparatus I. A circuit board 250 is mounted on the cover 230, and is electrically connected to the terminal of the relay terminal 240.

Liquid Detecting Apparatus

Figure 3:
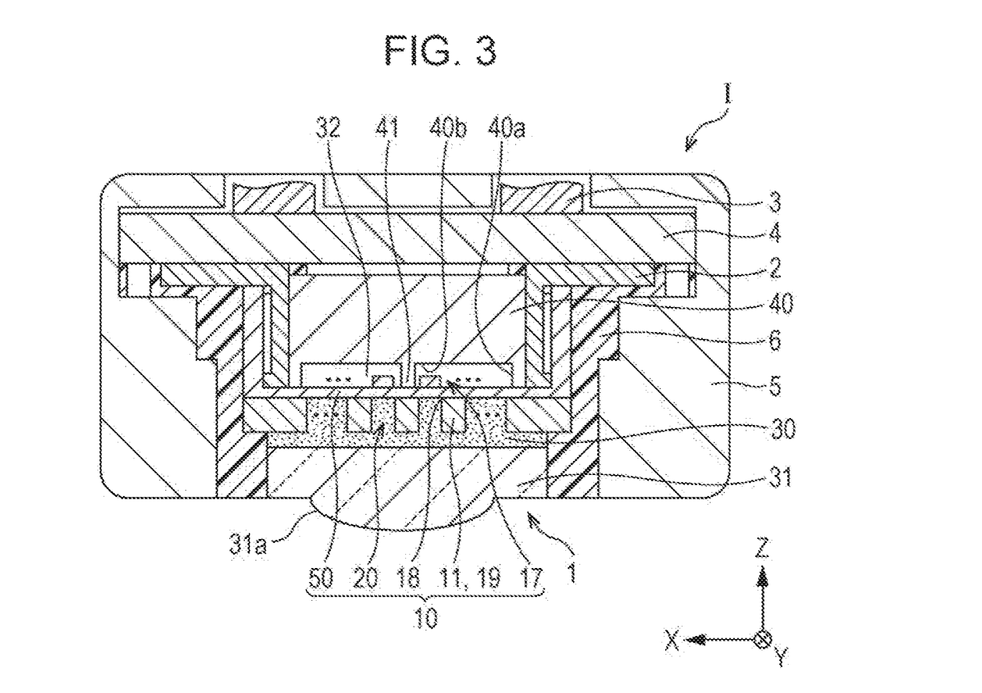
FIG. 3 is a sectional view illustrating an outline configuration of a liquid detecting apparatus according to the first embodiment.
Figure 4:
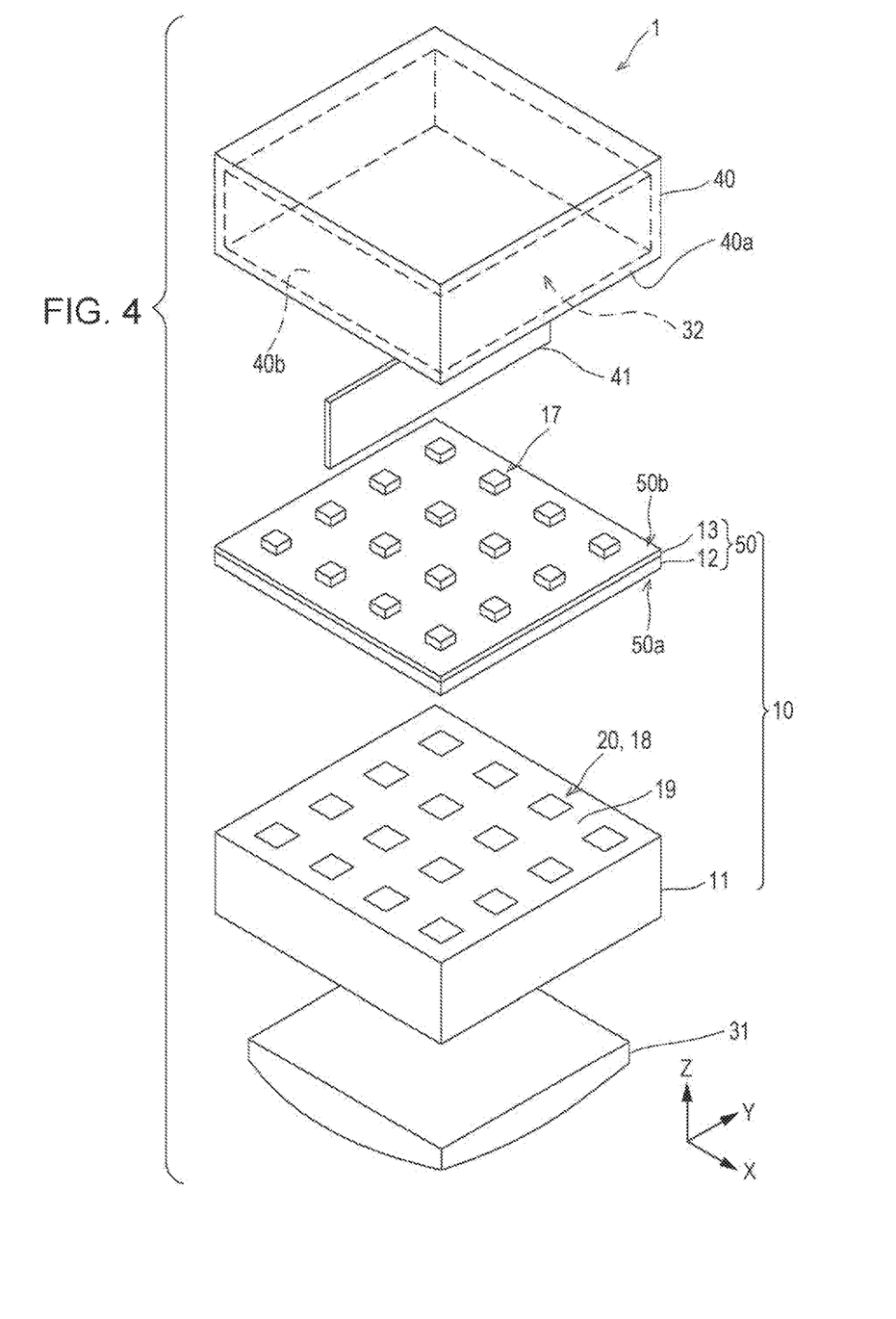
FIG. 4 is an exploded perspective view of an ultrasonic sensor according to the first embodiment.

FIG. 3 is a sectional view of the liquid detecting apparatus I according to the first embodiment, and FIG. 4 is an exploded perspective view of an ultrasonic sensor 1 that is installed in the liquid detecting apparatus I.

FIG. 3 is the sectional view illustrating a configuration example of the liquid detecting apparatus I in which the ultrasonic sensor 1 is installed according to the first embodiment of the invention. As illustrated in FIG. 3 and FIG. 4, the liquid detecting apparatus I is configured to include the CAV surface type ultrasonic sensor 1, a flexible printed circuit board (FPC substrate 2) that is connected to the ultrasonic sensor 1, a cable 3 that is pulled out from an apparatus terminal not illustrated, a relay substrate 4 that relays the FPC substrate 2 and the cable 3, a housing 5 that protects the ultrasonic sensor 1, the FPC substrate 2, and the relay substrate 4, and a water resistant resin 6 with which is filled between the housing 5 and the ultrasonic sensor 1. Although described in detail later, the ultrasonic sensor 1 is configured to include an ultrasonic element 10, an acoustic matching layer 30, a lens member 31, and a surrounding plate 40. The liquid detecting apparatus I is not limited to the above configuration, and may be configured to include other components if necessary.

The ultrasonic sensor 1 is configured to include the ultrasonic element 10, the acoustic matching layer 30, the lens member 31, and the surrounding plate 40. The ultrasonic element 10 is configured to include a substrate 11, a vibration plate 50, and a piezoelectric element 17. In FIG. 4, the surrounding plate 40 and a support member 41 are illustrated as separate portions, but both sides are integrally configured in actual.

When two axes orthogonal to each other are indicated by an X-axis and a Y-axis, and a plane formed by the X-axis and the Y-axis is indicated by an XY plane, the substrate 11 is disposed along the XY plane. Hereinafter, the X-axis is referred to as a first direction X, the Y-axis is referred to as a second direction Y, and a Z-axis orthogonal to any of the first direction X and the second direction Y is referred to as a third direction Z. The ultrasonic sensor 1 is disposed so that any one of the first direction X and the second direction Y coincides with upper and lower directions of FIG. 1.

On the substrate 11, a plurality of partition walls 19 are formed. By the plurality of partition walls 19, a plurality of spaces 20 are divided along the first direction X and the second direction Y. The space 20 is formed so as to penetrate through the substrate 11 in the third direction Z. The plurality of spaces 20 are formed two-dimensionally, that is, in the first direction X and the second direction Y. A disposition or a shape of the space 20 may be variously modified. For example, the plurality of spaces 20 may be formed one-dimensionally, that is, along any one of the first direction X and the second direction Y. The space 20 may have a rectangular shape (a ratio of lengths in the first direction X and the second direction Y is other values except 1:1) when viewed from the third direction Z.

The diaphragm 50 is disposed on the substrate 11 so as to close the space 20. Hereinafter, the surface of the diaphragm 50 on the substrate 11 side is referred to as a first surface 50a, and the surface facing the first surface 50a is referred to as a second surface 50b. The diaphragm is configured with an elastic film 12 formed on the substrate 11, and an insulator film 13 formed on the elastic film 12. In this case, the first surface 50a is configured by the elastic film 12, and the second surface 50b is configured by the insulator film 13.

As illustrated in FIG. 3 and FIG. 4, for example, the ultrasonic element 10 according to the first embodiment is configured from the piezoelectric element 17 that is formed on the elastic film 12 made of a silicon dioxide film which is disposed on one surface of the substrate 11 made of a silicon substrate, and the insulator film 13 made of a zirconium oxide, and includes a first electrode 14, a piezoelectric layer 15, and a second electrode 16. An opening portion 18 is formed in a region corresponding to the piezoelectric element 17 of the substrate 11, and the opening portion 18 is partitioned by the partition wall 19.

For example, in the substrate 11, it is possible to use a silicon monocrystalline substrate, but the substrate is not limited thereto. In the first embodiment, the diaphragm 50 is configured by the elastic film 12 formed of a silicon dioxide or the like, and the insulator film 13 formed of a zirconium oxide or the like, but the diaphragm 50 is not limited thereto, and may be any one thereof, or may be other films.

On the insulator film 13, the piezoelectric element 17, which is configured with the first electrode 14, the piezoelectric layer 15 being a thin film of which a thickness is 3 µm or less and preferably 0.3 to 1.5 µm, and the second electrode 16 through an adherable layer if necessary, is formed. Here, the piezoelectric element 17 is referred to as a portion including the first electrode 14, the piezoelectric layer 15, and the second electrode 16. In this manner, the piezoelectric layer 15 is a thin film formed by a liquid phase method or a gas phase method, is preferably a thin film formed by the liquid phase method, is different from a so-called bulk, and has piezoelectric properties and the like which are entirely different from each other.

In general, in a case where the piezoelectric element 17 is driven, one electrode of the electrodes is used as a common electrode, and the other electrode is used as an individual electrode. However, in the ultrasonic element 10, since the driving is performed per the plurality of ultrasonic elements 10, and scanning is performed, it is not realistic to discriminate that one thereof is used as a common electrode, and the other is used as an individual electrode. In any case, in a case where the ultrasonic element 10 is in the state of being disposed in parallel one-dimensionally or two-dimensionally, the first electrode is disposed so as to stretch in one direction, and the second electrode 16 is disposed so as to stretch in the direction which is orthogonal to one direction, a voltage is applied between the first electrode 14 and the second electrode 16 which are appropriately selected, thereby, it is possible to drive only a predetermined piezoelectric element 17.

The piezoelectric element 17 may be configured for optimization in transmission of the ultrasonic wave, may be configured for optimization in reception of the ultrasonic wave, or may be configured for optimization in both of transmission and reception of the ultrasonic wave. The ultrasonic sensor 1 is configured into a transmission-reception integrated type, but the piezoelectric element 17 may be applied to any type such as a transmission-only type, a reception-only type, or a transmission-reception integrated type, and may be designed so as to have high detection sensitivity, depending on a CAV type, an AVT type, the transmission-only type, the reception-only type, the transmission-reception integrated type, or the like.

Here, the piezoelectric element 17, the elastic film 12 and the insulator film 13 that are the vibration plate 50 in which displacement is generated due to the driving of the piezoelectric element 17, are collectively referred to as an actuator apparatus. In the example described above, the elastic film 12 and the insulator film 13, the adherable layer which is disposed if necessary, and the first electrode 14 serve as a diaphragm 50, but the configuration is not limited thereto. For example, the diaphragm 50 may not be disposed, and the piezoelectric element 17 itself may serve as substantially a function as a diaphragm.

The first electrode 14 and the second electrode 16 are not limited so long as the first electrode 14 and the second electrode 16 have conductivities, and for example, it is possible to use a metallic material such as platinum (Pt), iridium (Ir), gold (Au) aluminum (Al), copper (Cu), titanium (Ti), or stainless steel, a tin oxide-based conductive material such as indium tin oxide (ITO) or a fluorine-doped tin oxide (FTO), a zinc oxide-based conductive material, an oxide conductive material such as strontium ruthenate ($SrRuO_3$), lanthanum nickelate ($LaNiO_3$), or a chemical element doped strontium titanate, a conductive polymer, or the like. However, the first electrode 14 and the second electrode 16 are not limited to the above materials.

In the piezoelectric layer 15, representatively, it is possible to use a complex oxide of a lead zirconate titanate (PZT)-based perovskite structure. According thereto, a displacement amount of the piezoelectric element 17 is likely to be secured.

In the piezoelectric layer 15, it is possible to use a material which does not include lead, for example, a complex oxide of the perovskite structure including at least bismuth (Bi), barium (Ba), iron (Fe) and titanium (Ti). According thereto, it is possible to realize the ultrasonic element 10 by using a lead-free material of which a load on environments is small.

In an A site of such a perovskite structure, that is, a $ABO_3$ type structure, oxygen is coordinated to 12, and in a B site, oxygen is coordinated to 6, and an octahedral object (octahedron) is made. In the example of the piezoelectric layer 15 which does not include lead, Bi and Ba are located at the A site, and Fe and Ti are located at the B site.

In the complex oxide having the perovskite structure which includes Bi, Ba, Fe, and Ti, a composition formula is represented by (Bi, Ba) (Fe, Ti)$O_3$, but a representative composition is represented by a mixed crystal of a bismuth ferrate and a barium titanate. Such a mixed crystal means a mixed crystal in a case where it is not possible to detect the bismuth ferrate or the barium titanate alone, by an X-ray diffraction pattern. A composition deviating from the composition of the mixed crystal is also included.

Here, in the complex oxide of the perovskite structure, a case of deviating from a stoichiometric composition due to a loss or an excess, and a case where a portion of the chemical element is substituted with other chemical elements are included. That is, so long as the perovskite structure may be adopted, not only the deviation of an inevitable composition due to a lattice mismatch or an oxygen loss, but also the partial substitution of the chemical element are allowed.

The configuration of the complex oxide having the perovskite structure is not limited to the above example, and a configuration including other chemical elements may be made. For example, it is preferable that the piezoelectric layer 15 further include manganese (Mn). According thereto, a leak current is likely to be prevented, and it is possible to realize the ultrasonic element 10 with high reliability, for example, as a lead-free material.

In the A site of the piezoelectric layer 15, Bi may be substituted with lithium (Li), samarium (Sm), cerium (Ce) or the like, and Fe of the B site may be substituted with aluminum (Al), cobalt (Co) or the like. According thereto, diversification of the configuration or the function is achieved by enhancing various properties. Even in a case of the complex oxide including other chemical elements, it is preferable that the complex oxide have the perovskite structure.

The acoustic matching layer 30 is disposed within the space 20. The opening portion 18 or the like of the substrate 11 is filled with a resin having acoustic matching ability, and the acoustic matching layer 30 is disposed, thereby, it is possible to prevent acoustic impedance from sharply changing between the piezoelectric element 17 and a measurement target. As a result, it is possible to prevent propagation efficiency of the ultrasonic wave from being lowered. For example, the acoustic matching layer 30 may be configured from a silicone oil, a silicone resin, or a silicone rubber, but is not limited to the above example. It is possible to appropriately select and use a material depending on a use purpose or the like of the ultrasonic sensor 1.

The lens member 31 is disposed on the side which is opposite to the diaphragm 50 of the substrate 11. The lens member 31 has a role for converging the ultrasonic wave. The lens member 31 may be omitted, in such a case where the ultrasonic wave is converged by an electron focus method. Here, the acoustic matching layer 30 has a function of bonding the lens member 31 and the substrate 11. The ultrasonic sensor 1 is configured such that the acoustic matching layer 30 is interposed between the lens member 31 and the substrate 11 (partition wall 19).

The lens member 31 may be pressed toward the acoustic matching layer 30 side when the lens member 31 is mounted onto the ultrasonic element 10, or when adhesion of the lens member 31 is secured after the lens member 31 is mounted. Even in a case where the lens member 31 is not included, or a case where other members are disposed in place of the lens member 31, the pressing force may be applied to the diaphragm 50 from the acoustic matching layer 30 side in order to secure the adhesion of each portion. In the ultrasonic sensor 1, since the configuration is made to include the support member 41, as described above, even if a predetermined external pressure is applied to the diaphragm 50, it is possible to prevent structure distortion from being generated, and it is possible to secure high reliability.

The surrounding plate 40 is disposed on the second surface 50*b* side of the diaphragm 50. A recess portion (piezoelectric element retaining portion 32) is formed in the center of the surrounding plate 40, and the vicinity of the piezoelectric element retaining portion 32 is made into an edge portion 40*a* (see FIG. 4 or the like) of the surrounding plate 40. By the piezoelectric element retaining portion 32, the region (region including an upper surface and a side surface of the piezoelectric element 17) of the vicinity of the piezoelectric element 17 is covered. Accordingly, a surface corresponding to a bottom surface of the piezoelectric element retaining portion 32, is a surface 40*b* of the piezoelectric element 17 side of the surrounding plate 40.

The surrounding plate 40 is joined to the ultrasonic element 10 side in the edge portion 40*a*. In the joining of the surrounding plate 40, it is possible to use an adhesive (not illustrated), but the configuration is not limited to the above example. A depth of the piezoelectric element retaining portion 32, that is, the length of the third direction Z is approximately 80 μm, but is not limited to the above value. The depth of the piezoelectric element retaining portion 32 may be any value so long as the space is secured as a degree that does not hinder the driving of the piezoelectric element 17. The piezoelectric element retaining portion 32 may be filled with air, or may be filled with a resin. A thickness of the surrounding plate 40 is approximately 400 μm, but is not limited to the above value.

Method for Manufacturing Ultrasonic Sensor

Figure 5:
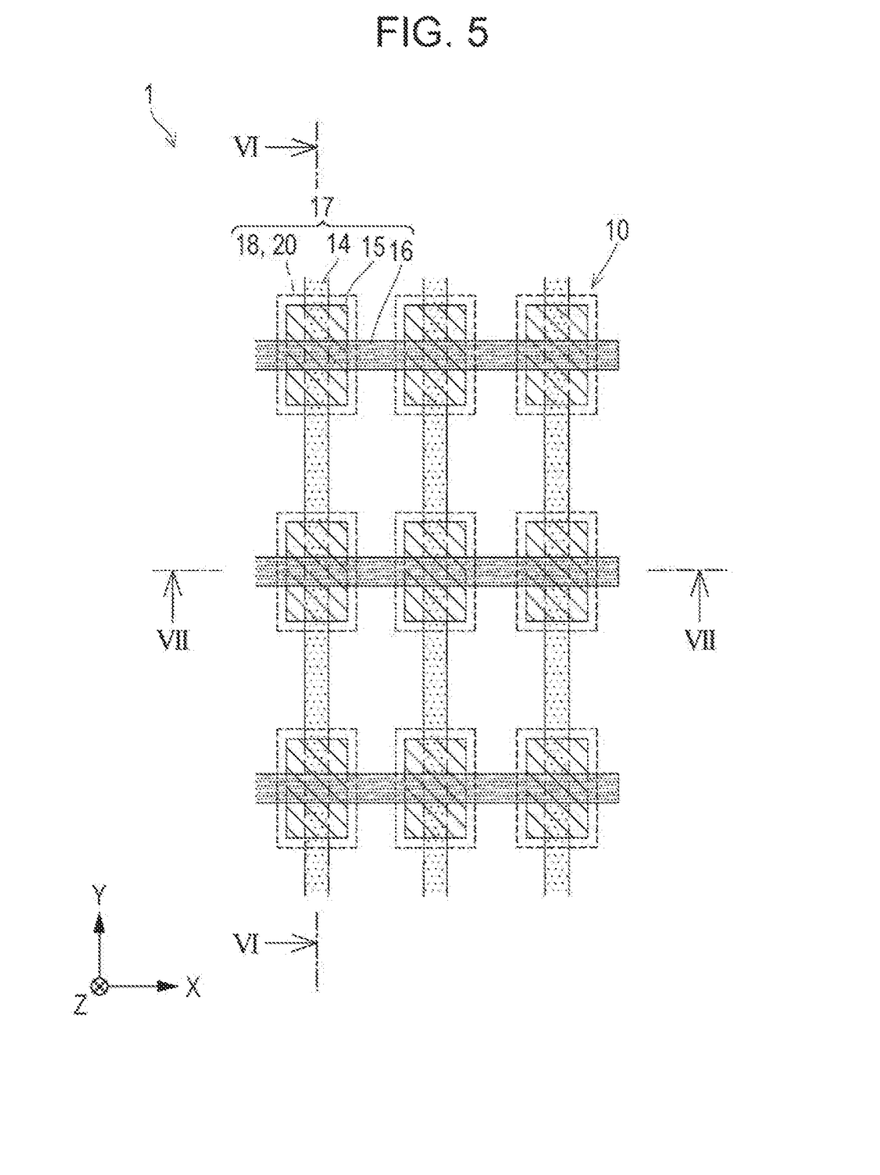
FIG. 5 is a main portion plan view illustrating an outline configuration of the ultrasonic sensor according to the first embodiment.

Next, a method for manufacturing the ultrasonic sensor 1 will be described with reference to FIG. 5 to FIG. 7. FIG. 5 is a main portion plan view, FIG. 6 is a sectional view taken along line VI-VI in FIG. 5, and FIG. 7 is a sectional view taken along line VII-VII in FIG. 5.

Figure 6:
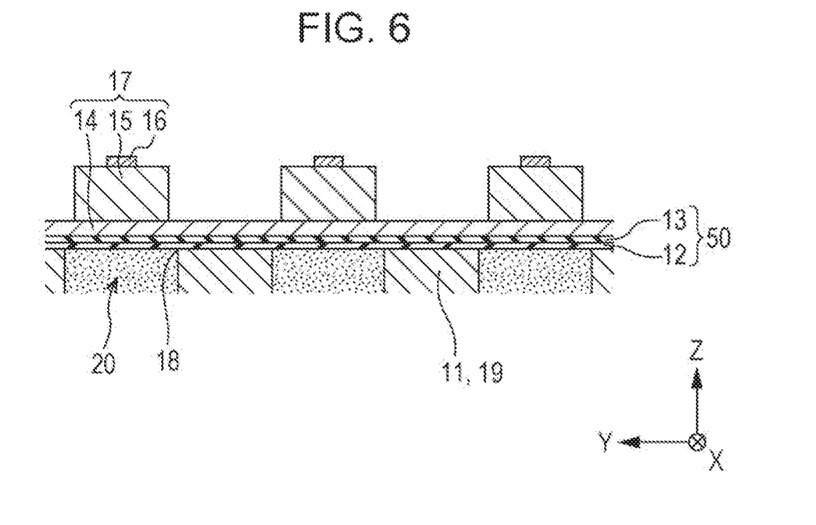
FIG. 6 is a sectional view taken along line VI-VI in FIG. 5.
Figure 7:
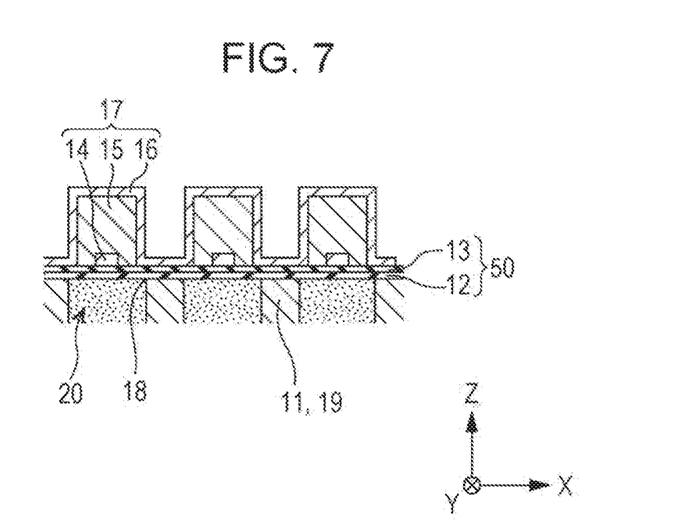
FIG. 7 is a sectional view taken along line VII-VII in FIG. 5.

First, as illustrated in FIG. 5 to FIG. 7, a silicon substrate is prepared as a substrate 11. Next, the substrate 11 is thermally oxidized, thereby, the elastic film 12 made of silicon dioxide ($SiO_2$) is formed on the surface thereof. Furthermore, a zirconium film is formed on the elastic film 12, with a sputtering method or a vapor deposition method, and by performing the thermal oxidation thereof, the insulator film 13 made of zirconium oxide ($ZrO_2$) is obtained. In this manner, the diaphragm 50 which is configured with the elastic film 12 and the insulator film 13 is formed on the substrate 11.

Next, the first electrode 14 is formed on the insulator film 13 of the diaphragm 50. For example, the first electrode 14 may be formed by a gas phase method such as a sputtering method, a vacuum vapor deposition method (PVD method), or a laser ablation method, or a liquid phase method such as a spin coating method. In the first embodiment, with the sputtering method, a film is formed in sequence of titanium, platinum, iridium, and titanium, thereby, the first electrode 14 is formed. Next, the first electrode 14 is patterned. For example, the patterning of the first electrode 14 may be performed by dry etching such as reactive ion etching (RIE) or ion milling, or wet etching using an etching solution. The shape in patterning of the first electrode 14 is not particularly limited.

Next, a film of titanium is formed as a thickness of 4 nm, on the first electrode 14, by the sputtering method, and the piezoelectric layer 15 is formed thereon. A method for forming the piezoelectric layer 15 is not limited. For example, it is possible to use a metal-organic decomposition (MOD) method of obtaining a metal oxide by coating and drying a solution (precursor solution) which includes a metal complex, and further baking at a high temperature, or a chemical solution method (wet method) such as a sol-gel method. Additionally, it is possible to manufacture the piezoelectric layer 15 by a laser ablation method, a sputtering method, a pulse laser deposition (PLD) method, a chemical vapor deposition (CVD) method, an aerosol deposition method, a gas phase method, a liquid phase method, or a solid phase method.

For example, the piezoelectric layer 15 formed by the wet method, includes a plurality of piezoelectric films (not illustrated) formed by a series of processes of a process (coating process) for a precursor film by coating the precursor solution, a process (drying process) for drying the precursor film, a process (degreasing process) for degreasing by heating the dried precursor film, and a process (baking process) for baking the degreased precursor film. That is, the piezoelectric layer 15 is formed by repeating the series of processes which are from the coating process to the baking process several times. In the series of processes described above, after the performing is repeated several times from the coating process to the degreasing process, the baking process may be carried out.

The layer or the film formed by the wet method has an interface. In the layer or the film formed by the wet method, a trace of the coating or the baking remains. Such a trace becomes the "interface" that may be confirmed by observing a cross section thereof, or analyzing concentration distribution of the chemical element within the layer (or within the film). Strictly speaking, the "interface" means a boundary between the layers or between the films, but here, means the vicinity of the boundary of the layer or the film. In a case where the cross section of the layer or the film formed by the wet method is observed, such an interface is confirmed as a portion of which color is darker than those of other portions, or as a portion of which color is lighter than those of other portions, in the vicinity of the boundary of the adjacent layers or films. In a case where the concentration distribution of the chemical element is analyzed, such an interface is confirmed as a portion of which the chemical element concentration is higher than those of other portions, or as a portion of which the chemical element concentration is lower than those of other portions, in the vicinity of the boundary of the adjacent layers or films. Since the piezoelectric layer 15 is formed (configured with the plurality of piezoelectric films) by repeating the series of processes which are from the coating process to the baking process several times, or carrying out the baking process after repeating the performing several times from the coating process to the degreasing process, the piezoelectric layer 15 has a plurality of interfaces, correspondingly to the respective piezoelectric films.

An example of a specific procedure in a case where the piezoelectric layer 15 is formed by the wet method, is as follows. First, the precursor solution for forming the piezoelectric layer 15, which is configured with an MOD solution including the metal complex, or a sol, is adjusted (adjusting process). Therefore, the precursor solution is coated onto the patterned first electrode 14 by using the spin coating method or the like, thereby, the precursor film is formed (coating process). Next, the precursor film is heated at a predetermined temperature, for example, approximately 130° C. to 250° C., and is dried for a fixed period of time (drying process), and the dried precursor film is further heated at a predetermined temperature, for example, approximately 300° C. to 450° C., and is retained for the fixed period of time, thereby, the degreasing is performed (degreasing process). Furthermore, the degreased precursor film is heated at a temperature which is higher than ever, for example, approximately 650° C. to 800° C., and is retained at the temperature for the fixed period of time, thereby, crystallization is performed, and the piezoelectric film is formed (baking process). Therefore, the coating process, the drying process, the degreasing process, and the baking process described above are repeated several times, thereby, the piezoelectric layer 15 which is configured with the plurality of piezoelectric films is formed.

The precursor solution described above is a precursor solution in which the metal complexes that may form the perovskite type complex oxide described above, by the baking, are respectively dissolved or dispersed into an organic solvent. That is, the precursor solution includes each chemical element which may form the perovskite type complex oxide described above, as a central metal of the metal complex. At that time, the metal complex including a chemical element other than the above chemical elements, for example, the metal complex including an adding material such as Mn, Li, Ba, Ca, Sr, Zr, Ti, Ta, Sb, Fe, Co, Ag, Mg, Zn, Cu, La, Sm, Ce, or Al may be further mixed.

As a metal complex including the above chemical elements, for example, it is possible to use an alkoxide, an organic acid salt, a β-diketone complex, or the like. In the precursor solution, a mixing ratio of the metal complex may be any value so long as being mixed so that the respective metal chemical element included in the perovskite type complex oxide have desired molar ratios.

As an organic solvent used for the manufacturing of the precursor solution, for example, propanol, butanol, pentanol, hexanol, octanol, ethylene glycol, propylene glycol, octane, decane, cyclohexane, xylene, toluene, tetrahydrofuran, acetic acid, octylic acid, 2-n-butoxyethanol, n-octane or the like, or a mixed solvent thereof may be used. The precursor solution may include an additive for stabilizing the dispersion of each metal complex. As such an additive, 2-ethylhexanoic acid or the like may be used.

As a heating apparatus used in the drying process, the degreasing process, and the baking process, for example, a rapid thermal annealing (RTA) apparatus that performs the heating with irradiation of an infrared lamp, a hot plate, or the like may be used.

Next, the piezoelectric layer 15 formed of the plurality of piezoelectric films is patterned. It is possible to perform the patterning by the so-called dry etching such as the reactive ion etching or the ion milling, or the wet etching using the etching solution. The shape in patterning of the piezoelectric layer 15 is not particularly limited.

Next, the second electrode 16 is formed on the patterned piezoelectric layer 15. It is possible to form the second electrode 16 by the same method as that of the first electrode 14. The shape in patterning of the second electrode 16 is not particularly limited. In the first embodiment, a reheating treatment (post annealing) may be performed in a temperature range of approximately 600° C. to 800° C., if necessary, before and after the second electrode 16 is formed on the piezoelectric layer 15. In this manner, by performing the post annealing, it is possible to form a favorable interface between the piezoelectric layer 15 and the first electrode 14, or between the piezoelectric layer and the second electrode 16, and it is possible to improve crystallinity of the piezoelectric layer 15. In the first embodiment, after the film of platinum having the thickness of 20 nm is formed by the sputtering method, the patterning is performed, thereon, an iridium film having the thickness of 30 nm is formed, and a titanium film having the thickness of 15 nm is formed, by the sputtering method, and the second electrode 16 is made by performing the patterning.

By the above processes, the piezoelectric element 17 including the first electrode 14, the piezoelectric layer 15, and the second electrode 16 is completed. In other words, a portion where the first electrode 14, the piezoelectric layer 15, and the second electrode 16 are overlapped becomes the piezoelectric element 17.

Next, a wafer surface of the side which is opposite to the piezoelectric element 17 is polished, thereby, an oxide film is removed, the patterning is performed by using a resist, the dry etching is performed by using argon plasma, and the space 20 is formed.

Thereafter, the unneeded portions is cut and removed by dicing or the like, and the acoustic matching layer 30, the surrounding plate 40, and the like illustrated in FIG. 3 are disposed, with a general method, and the ultrasonic sensor 1 is made. The method for manufacturing the ultrasonic sensor 1 is not limited to the above manufacturing method.

The ultrasonic sensor 1 described above is incorporated into the ink cartridge 100 as illustrated in FIG. 1, thereby, it is possible to perform the detection of the liquid, and for example, it is possible to detect that the amount of the liquid becomes small as a predetermined threshold value from a threshold value.

The detection of the liquid by the ultrasonic sensor 1 may be performed by incorporating the detection surface 31a of the lens member 31 in the state of being in contact with the liquid.

At that time, in the ultrasonic sensor 1 according to the first embodiment, since the lens member 31 is disposed on the space 20 side through the acoustic matching layer 30, and the surface of the lens member 31 becomes the detection surface 31a, it is relatively easy to perform the incorporation in the state of being in contact with the liquid L within the liquid detection flow path 160 of the ink cartridge 100, as illustrated in FIG. 2.

The detection of the liquid L will be described in detail later, but it is possible to detect presence or absence of the liquid L, or the amount of the liquid L, by detecting a reception voltage when transmission and reception of the ultrasonic wave are performed.

The detection of the liquid L will be described in detail later, but frequency dependence when the voltage is applied to the ultrasonic element 10 of the ultrasonic sensor 1 is evaluated, thereby, it is possible to detect presence or absence of the liquid L, or the amount of the liquid L. For example, as described later, in a case where the liquid L is present, a resonance peak becomes low, and in a case where the liquid L is not present, the resonance peak becomes large, and it is possible to detect the amount of the liquid L by observing the change.

At that time, since the ultrasonic element 10 including the piezoelectric layer 15 of the thin film is included, a resonance frequency is a frequency which is higher than that of the bulk in the related art, for example, several MHz, and there is an advantage that sharpness of separation of the resonance peak is high.

In the first embodiment, since the acoustic matching layer 30 is disposed within the space 20, and the lens member 31 is disposed thereon, thereby, the detection surface 31a is made, there are advantages that a liquid resistant countermeasure of the ultrasonic element 10 side is relatively easily made, and the manufacturing is relatively easy.

Second Embodiment

Figure 8:
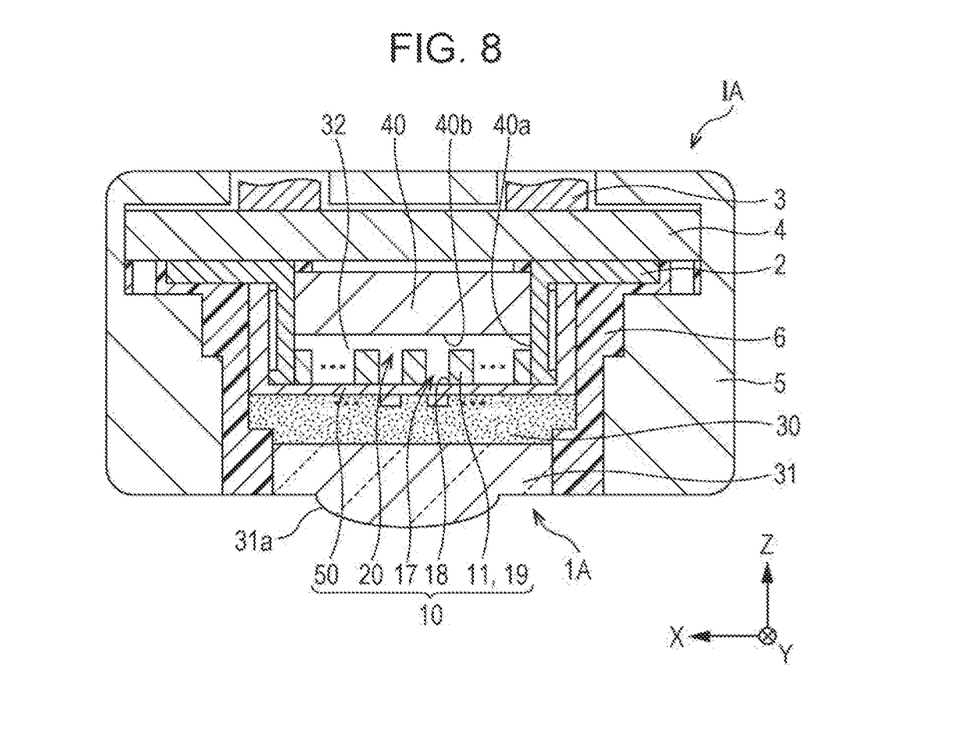
FIG. 8 is a sectional view illustrating an outline configuration of a liquid detecting apparatus according to a second embodiment.

FIG. 8 is a sectional view illustrating an outline configuration of the liquid detecting apparatus in which the ultrasonic sensor is installed according to a second embodiment of the invention.

In the first embodiment described above, the acoustic matching layer 30 is disposed within the space 20, and the lens member 31 is disposed thereon, but in a liquid detecting apparatus IA of the second embodiment, the acoustic matching layer 30 is disposed so as to cover the ultrasonic element 10, the lens member 31 is disposed thereon, and an ACT surface type ultrasonic sensor 1A is installed.

Specifically, as illustrated in FIG. 8, the acoustic matching layer 30 formed of the resin or the like having the acoustic matching ability is disposed so as to cover the ultrasonic element 10, and the lens member 31 is disposed thereon. Thereby, since a configuration of performing transmission and reception of the ultrasonic wave from the side of the lens member 31 which is disposed on the ultrasonic element 10 side is made, there is an advantage that the sensitivity in transmission and reception of the ultrasonic wave is improved in comparison with the first embodiment. Thereby, it is possible to achieve the improvement in detection performance of the liquid.

Since the other configurations are the same as those of the first embodiment, the same reference marks are attached to the same members, and the repeated description will be omitted.

Example 1 of Liquid Detection

As illustrated in FIG. 1, the liquid detecting apparatus I of FIG. 3 is incorporated into the ink cartridge 100, and the detection of the liquid is performed.

Figure 9:
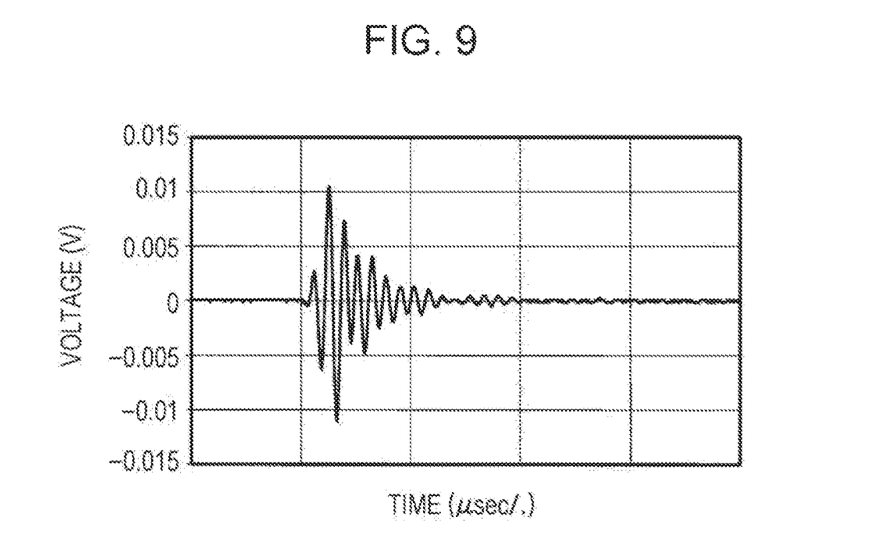
FIG. 9 is a diagram illustrating a result of Example 1.

In Example 1, transmission and reception of the ultrasonic wave are performed in the ultrasonic sensor 1, and the reception voltage illustrated in FIG. 9 is obtained, in a case where the liquid L is present within the liquid detection flow path 160.

On the other hand, in a case where the liquid L is not present, it is not possible to confirm the reception voltage.

In a drive signal for transmission, a reference voltage $V_{pp}=1V$, an applied voltage $V_{bias}=10V$, and a sine wave of 1.5 cycle is made.

Example 2 of Liquid Detection

As illustrated in FIG. 1, the liquid detecting apparatus IA of FIG. 8 is incorporated into the ink cartridge 100, and the detection of the liquid is performed.

In Example 2, transmission and reception of the ultrasonic wave are performed in the same manner as Example 1, but the reception voltage illustrated in FIG. 9 is obtained in a case where the liquid L is present, the reception voltage illustrated in FIG. 9 is obtained, and meanwhile, in a case where the liquid L is not present, it is not possible to confirm the reception voltage, in the same manner as Example 1.

Example 3 of Liquid Detection

The liquid detecting apparatus I of FIG. 3 is incorporated into the ink cartridge 100 as illustrated in FIG. 1, and the detection of the liquid is performed.

Figure 10:
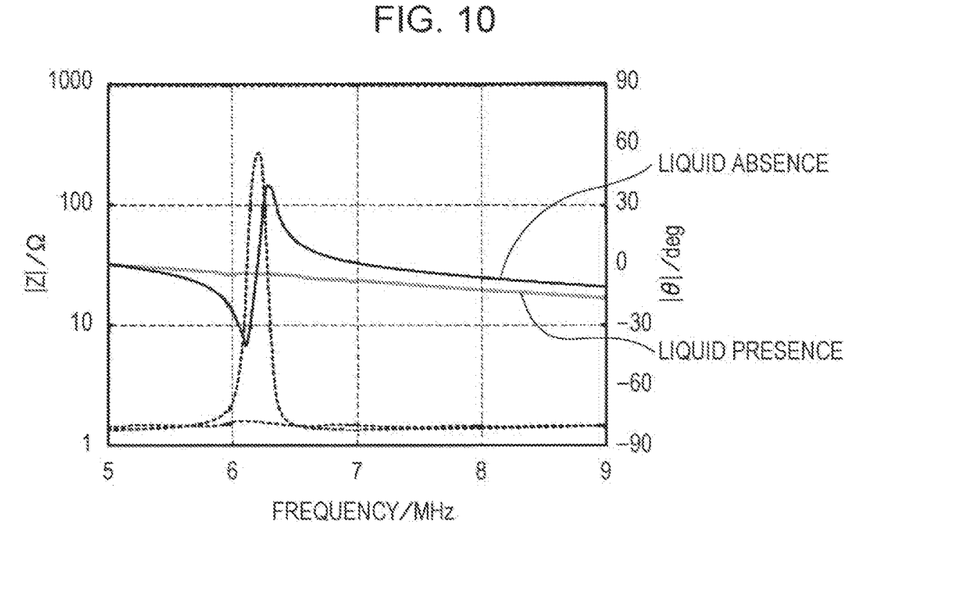
FIG. 10 is a diagram illustrating a result of Example 3.

The frequency dependence after the voltage is applied to the ultrasonic sensor 1 is evaluated. As a result, the result of FIG. 10 is obtained. As illustrated in FIG. 10, in a case where the liquid L is present, the resonance peak becomes low, and in a case where the liquid L is not present, the resonance peak becomes large, and it is possible to detect presence or absence of the liquid L.

Example 4 of Liquid Detection

The liquid detecting apparatus IA of FIG. 8 is incorporated into the ink cartridge 100 as illustrated in FIG. 1, and the detection of the liquid is performed.

In Example 4, the frequency dependence after the voltage is applied to the ultrasonic sensor 1 is evaluated in the same manner as Example 1. As a result, the same result as that of FIG. 10 is obtained, in the same manner as Example 3.

Example 5 of Liquid Detection

As illustrated in FIG. 1, the liquid detecting apparatus I of FIG. 1 is incorporated into the ink cartridge 100, and the detection of the liquid is performed.

In Example 5, the frequency dependence after the voltage is applied to the ultrasonic sensor 1 is evaluated in the same manner as Example 3.

Figure 11:
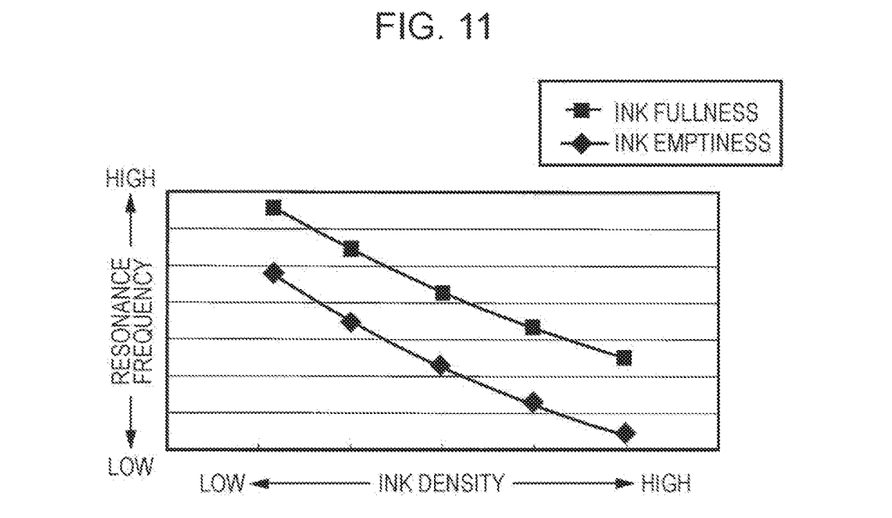
FIG. 11 is a diagram illustrating a result of Example 5.

As a result, the result of FIG. 11 is obtained. That is, it is possible to detect that the resonance frequency decreases in a case where the liquid L is present, and the resonance frequency increases in a case where the liquid L is not present. Accordingly, it is found out that it is possible to detect presence or absence of the liquid.

It is found out that the resonance frequency measured in this manner is changed depending on a sort of the liquid. Accordingly, for example, in a case where the liquid (ink) into which a solid content is dispersed is used, it is found out that the resonance frequency in a state where the solid content is finely dispersed, and the resonance frequency in a state where the solid content is precipitated are different from each other. Therefore, according to the liquid detecting apparatus of the invention, it is possible to detect a dispersion state of the solid content, in the liquid of the state where the solid content is dispersed.

Specifically, in the state where the solid content is dispersed, the resonance frequency decreases, and in a case where the solid content is precipitated, the resonance frequency increases, thereby, it is estimated that a difference between both sides may be discriminated.

What is claimed is:

1. A liquid detecting apparatus comprising:
an ultrasonic sensor that transmits and receives an ultrasonic wave, and includes a piezoelectric layer which is formed of a thin film and an ultrasonic element which is provided with a first electrode and a second electrode to interpose the piezoelectric layer between the first electrode and the second electrode, on a diaphragm which is disposed on a substrate having a cavity; and
a flow path that forms the same liquid level as a liquid level of a liquid which is stored in a container,
wherein an acoustic matching layer and a detection surface of a surface of a lens, which are disposed on a side of the ultrasonic sensor that transmits and receives the ultrasonic wave, are disposed to be in contact with the liquid within the flow path.

2. The liquid detecting apparatus according to claim 1, wherein a liquid amount is detected depending on a change of a voltage when the ultrasonic wave transmitted from the ultrasonic element is received.

3. A liquid container comprising:
the liquid detecting apparatus according to claim 2.

4. The liquid detecting apparatus according to claim 1, wherein a liquid amount is detected from frequency dependence when a voltage of which a frequency is changed is applied to the ultrasonic element.

5. A liquid container comprising:
the liquid detecting apparatus according to claim 4.

6. The liquid detecting apparatus according to claim 1, wherein the detection surface of the ultrasonic sensor is on a side that is opposite to the diaphragm of the ultrasonic element, and is the surface of the lens that is disposed on the acoustic matching layer covering the ultrasonic element.

7. A liquid container comprising:
the liquid detecting apparatus according to claim 6.

8. The liquid detecting apparatus according to claim 1, wherein the detection surface of the ultrasonic sensor is on a side of the cavity, and is the surface of the lens that is disposed on the acoustic matching layer with which the cavity is filled.

9. A liquid container comprising:
the liquid detecting apparatus according to claim 8.

10. The liquid detecting apparatus according to claim 1, wherein a solid content is dispersed into the liquid, and a dispersion state of the solid content is detected from the frequency dependence when the voltage of which the frequency is changed is applied to the ultrasonic element.

11. A liquid container comprising:
the liquid detecting apparatus according to claim 10.

12. A liquid container comprising:
the liquid detecting apparatus according to claim 1.

* * * * *